US010604682B2

(12) United States Patent
Isobe et al.

(10) Patent No.: US 10,604,682 B2
(45) Date of Patent: Mar. 31, 2020

(54) HOT-MELT PRESSURE-SENSITIVE ADHESIVE

(71) Applicant: HENKEL AG & CO. KGAA, Duesseldorf (DE)

(72) Inventors: Yukio Isobe, Osaka (JP); Itsuro Tomatsu, Osaka (JP); Tadashi Hayakawa, Osaka (JP)

(73) Assignee: HENKEL AG & CO. KGAA, Duesseldorf (DE)

(*) Notice: Subject to any disclaimer, the term of this patent is extended or adjusted under 35 U.S.C. 154(b) by 92 days.

(21) Appl. No.: 15/274,082

(22) Filed: Sep. 23, 2016

(65) Prior Publication Data
US 2017/0022399 A1   Jan. 26, 2017

Related U.S. Application Data

(63) Continuation of application No. PCT/JP2015/059826, filed on Mar. 24, 2015.

(30) Foreign Application Priority Data

Mar. 26, 2014  (JP) ................. 2014-064267

(51) Int. Cl.
C09J 125/06 (2006.01)
C09J 153/02 (2006.01)
C08L 25/06 (2006.01)
C08L 53/02 (2006.01)

(52) U.S. Cl.
CPC ............. *C09J 125/06* (2013.01); *C08L 25/06* (2013.01); *C08L 53/02* (2013.01); *C09J 153/02* (2013.01)

(58) Field of Classification Search
CPC ............................. C09J 153/02; C09J 125/06
See application file for complete search history.

(56) References Cited

U.S. PATENT DOCUMENTS

| | | | |
|---|---|---|---|
| 3,630,980 A | 12/1971 | Russell | |
| 6,495,621 B1 | 12/2002 | Kurasawa et al. | |
| 2001/0014419 A1* | 8/2001 | Schubert | H01M 2/08 429/185 |
| 2002/0107323 A1* | 8/2002 | Uzee | C08L 9/06 525/95 |
| 2004/0102551 A1 | 5/2004 | Sato et al. | |
| 2005/0054780 A1* | 3/2005 | Zhou | B32B 7/12 525/240 |
| 2007/0196604 A1 | 8/2007 | Kurokawa et al. | |
| 2013/0165568 A1 | 6/2013 | Goubard | |
| 2013/0260632 A1* | 10/2013 | Thomas | B32B 27/12 442/398 |

FOREIGN PATENT DOCUMENTS

| | | |
|---|---|---|
| CN | 103098176 A | 5/2013 |
| JP | 2004-051688 A | 2/2004 |
| JP | 4216010 B2 | 1/2009 |
| JP | 2011-162747 A | 8/2011 |

* cited by examiner

Primary Examiner — Jeffrey C Mullis
(74) Attorney, Agent, or Firm — Sun Hee Lehmann

(57) ABSTRACT

To provide a hot-melt pressure-sensitive adhesive which is easily coated, has a weak odor, high stability with time, and is also excellent in adhesive force retention performance from a low temperature range to a high temperature range. A hot-melt pressure-sensitive adhesive comprising: an amorphous polystyrene resin (A) having a number-average molecular weight of 50,000 or more; and a thermoplastic block copolymer (B) which is a copolymer of vinyl-based aromatic hydrocarbons and conjugated diene compounds.

4 Claims, No Drawings

HOT-MELT PRESSURE-SENSITIVE ADHESIVE

FIELD OF THE INVENTION

The present invention relates to a hot-melt pressure-sensitive adhesive, and more particularly to a pressure-sensitive adhesive used for pressure-sensitive adhesive products such as a pressure-sensitive adhesive label, a pressure-sensitive adhesive tape, and a hygiene material.

BACKGROUND OF THE INVENTION

The hot-melt pressure-sensitive adhesive means a pressure-sensitive adhesive which is melted under heating. The hot-melt pressure-sensitive adhesive can be coated on an adherend with no solvent, is solidified by cooling, and exhibits pressure-sensitive adhessiveness in a solidified state. The hot-melt pressure-sensitive adhesive is used for a wide variety of pressure-sensitive adhesive products in paper processing, wood working, hygiene materials, and electronic fields.

In general, the "pressure-sensitive adhesive", i.e., PSA means a binding material which adheres only by contact, and immediately exhibits adhesive force durable for practical use without necessity for accompanying a change in state from liquid to solid. On the other hand, a binding material that requires a change in state from liquid to solid in order to exhibit adhesive force durable for practical use is referred to as an "adhesive". When exhibiting adhesive force, the adhesive requires a process of changing from solid to liquid such as evaporation of a solvent, cooling, and a chemical reaction, and thus requires a substantial solidification time.

Hot-melt PSAs comprising various styrene-based elastomers as base polymers are known as examples of conventional hot-melt PSA. Such a conventional composition is a hot-melt-type PSA composition comprising, as a base polymer, a styrene-butadiene-styrene block copolymer (hereinafter also referred to as "SBS") or a styrene-isoprene-styrene block copolymer (hereinafter also referred to as "SIS").

The hot-melt PSA comprising, as a base polymer, a styrene block copolymer is frequently applied to base materials such as paper, non-woven fabric, a label, and a film, or adherends.

JP 2001-162747 A discloses a hot-melt-type PSA composition obtained by blending a styrene-based block copolymer, a tackifier resin, and a plasticizer (the claims, paragraph [0013] etc.) The hot-melt PSA in the same literature contains a styrene resin, a petroleum-based resin and/or a terpene-based resin as the tackifier resin (paragraph [0023], Table 1). It is described as follows: The hot-melt adhesive exhibits excellent adhesive force in a wide temperature range from a low temperature to a high temperature, and achieves effects such as having no contamination and stickiness due to bleeding of a plasticizer ([0018]).

However, this hot-melt PSA has a strong odor, a high load imposed on a worker and a user using PSA products, and a high environmental load. Also, its viscosity is reduced with time particularly under a high temperature environment and thus it is poor in stability with time. Further, its adhesive force decreases under a high temperature environment or a low temperature environment and thus adhesive force retention performance from a low temperature range to a high temperature range is yet to be sufficient.

JP 2004-051688 A discloses a bonding resin composition comprising a polystyrene-based resin having a high-molecular weight, crystalline syndiotactic structure as a polystyrene resin, and a styrene-based elastomer (claim 1, paragraph [0049]). However, the bonding resin composition of JP 2004-051688 A has no pressure-sensitive adhessiveness and thus is not preferred for producing PSA products. Since the bonding resin composition in the same literature has an extremely high viscosity compared with hot-melt PSAs, coating by means of a roll coater or the like is difficult.

Recently, from a rise in awareness of environmental problems, hot-melt PSAs using a non-petroleum-based resin are studied as the hot-melt PSA. However, the non-petroleum-based resin has insufficient compatibility with other components such as a tackifier resin, pressure-sensitive adhessiveness of the hot-melt PSA decreases with time.

SUMMARY OF THE INVENTION

The present invention solves the above conventional problems, and an object thereof is to provide a hot-melt PSA which is easily coated, has a weak odor, high stability with time, and is also excellent in adhesive force retention performance from a low temperature range to a high temperature range.

The present invention provides a hot-melt PSA including: an amorphous polystyrene resin (A) having a weight-average molecular weight of 50,000 or more; and a thermoplastic block copolymer (B) which is a copolymer of vinyl-based aromatic hydrocarbons and conjugated diene compounds.

In one embodiment, a blending amount of the amorphous polystyrene rein (A) in 100 parts by weight of the total amount of the amorphous polystyrene resin (A) and the thermoplastic block copolymer (B) is 15 to 80 parts by weight.

In one embodiment, the hot-melt PSA further includes a tackifier (C).

In one embodiment, the thermoplastic block copolymer (B) is an unhydrogenated product.

In one embodiment, the thermoplastic block copolymer (B) includes at least one selected from a styrene-butadiene-styrene copolymer and a styrene-isoprene-styrene copolymer.

In one embodiment, the amorphous polystyrene resin (A) is a recycled resin.

Also, the present invention provides a PSA product obtained by coating any of the hot-melt PSAs.

The hot-melt PSA of the present invention is easily coated, has a weak odor, a low load imposed on a worker and a user using PSA products, and a low environmental load. Also, its viscosity hardly changes with time and thus it has high stability with time. Further, its adhesive force is retained under a high temperature environment or a low temperature environment and thus adhesive force retention performance from a low temperature range to a high temperature range is high.

In particular, when the amorphous polystyrene resin (A) is a recycled resin, the hot-melt PSA of the present invention becomes a PSA having a low environmental load.

In the PSA product of the present invention, respective members such as a plastic film, nonwoven fabric and paper are pasted and processed by the hot-melt PSA, the pressure-sensitive adhessiveness is retained even during low temperature in winter, and high temperature in summer, and the odor also becomes weaker. Further, the respective members do not peel off during warehouse storage and also under body temperature when disposable products are used.

DETAILED DESCRIPTION OF THE INVENTION

The hot-melt PSA of the present invention includes an amorphous polystyrene resin (A) having a weight-average molecular weight of 50,000 or more, and a thermoplastic block copolymer (B) which is a copolymer of vinyl-based aromatic hydrocarbons and conjugated diene compounds.

The amorphous polystyrene resin (A) is a polystyrene with random molecular arrangement. Since the amorphous polystyrene resin has substantially no crystal, it does not indicate a specific melting point. In the present invention, as the amorphous polystyrene, those which have a weight-average molecular weight of 50,000 or more are used.

The melting point in the present specification means the peak temperature of endothermic peaks due to melting of the crystal structure in differential scanning calorimetry (DSC). The weight-average molecular weight means a value in terms of polystyrene measured by gel permeation chromatography (GPC).

The weight-average molecular weight of the amorphous polystyrene resin (A) is, for example, 100,000 or more, preferably 150,000-400,000, and more preferably 230,000-360,000.

The amorphous polystyrene resin (A) having the above weight-average molecular weight improves dispersibility to the thermoplastic block copolymer (B) components. The improvement in the dispersibility of the amorphous polystyrene resin (A) makes the hot-melt PSA of the present invention achieve favorable adhesive force at a low temperature, and stability with time.

Examples of the amorphous polystyrene resin (A) include GPPS (General Purpose Polystyrene) and EPS (Expandable Polystyrene).

Examples of the amorphous polystyrene resin (A) include commercially available products such as "Dick Styrene CR-3500" (trade name) manufactured by DIC Corporation, "PSJ-polystyrene HF77" (trade name) and "PSJ-polystyrene 679" (trade name) manufactured by PS Japan Corporation, "TOYO STYROL GP G100C" (trade name), "TOYO STYROL GP G200C" (trade name) and "TOYO STYROL GP HRM26" (trade name) manufactured by TOW STYRENE CO., LTD., "GPPS-550" (trade name), "GPPS-550N" (trade name), "GPPS-525" (trade name) and "GPPS-525N" (trade name) manufactured by VIETNAM POLYSTYRENE CO., LTD., and the like. These amorphous polystyrene resins can be used alone or in combination.

Considering the environment, the amorphous polystyrene resin (A) may be those which are recovered from industrial and general markets. For example, recovered products such as flashes and runners generated during molding of the amorphous polystyrene resin, and recovered products after used as food trays and the like are exemplified.

In the present invention, the "thermoplastic block copolymer (B)" means a copolymer obtained by block copolymerization of vinyl-based aromatic hydrocarbons and conjugated diene compounds. Usually, the thermoplastic block copolymer (B) is a resin composition including a vinyl-based aromatic hydrocarbon block and a conjugated diene compound block.

As used herein, the "vinyl-based aromatic hydrocarbon" means an aromatic hydrocarbon compound having a vinyl group. Specific examples thereof include styrene, o-methyl styrene, p-methyl styrene, p-tert-butyl styrene, 1,3-dimethyl styrene, α-methyl styrene, vinyl naphthalene, vinyl anthracene, and the like. Particularly, styrene is preferable. These vinyl-based aromatic hydrocarbons can be used alone or in combination of two or more.

The "conjugated diene compound" means a diolefin compound having at least a pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene, and 1,3-hexadiene. Particularly, 1,3-butadiene and 2-methyl-1,3-butadiene are preferable. These conjugated diene compounds can be used alone or in combination of two or more.

The thermoplastic block copolymer (B) according to the present invention may be either an unhydrogenated product or a hydrogenated product.

Specific examples of the "unhydrogenated product of the thermoplastic block copolymer (B)" include those in which blocks based on the conjugated diene compound are not hydrogenated. Specific examples of the "hydrogenated product of the thermoplastic block copolymer (B)" include block copolymers in which blocks based on the conjugated diene compound are entirely or partially hydrogenated.

A proportion that the "hydrogenated product of the thermoplastic block copolymer (B)" is hydrogenated can be indicated by a "hydrogenation ratio". The "hydrogenation ratio" of the "hydrogenated product of the thermoplastic block copolymer (B)" refers to a proportion of double bonds converted into saturated hydrocarbon bonds by hydrogenation on the basis of all aliphatic double bonds included in the blocks based on the conjugated diene compound. The "hydrogenation ratio" can be measured by an infrared spectrophotometer, a nuclear magnetic resonance spectrometer, and the like.

Specific examples of the "unhydrogenated product of the thermoplastic block copolymer (B)" include a styrene-isoprene block copolymer (also referred to as "SIS") and a styrene-butadiene block copolymer (also referred to as "SBS"). Specific examples of the "hydrogenated product of the thermoplastic block copolymer (B)" include a hydrogenated styrene-isoprene block copolymer (also referred to as "SEPS") and a hydrogenated styrene-butadiene block copolymer (also referred to as "SEBS").

In the present invention, the thermoplastic block copolymer (B) preferably includes at least one selected from a styrene-butadiene-styrene copolymer (SBS) and a styrene-isoprene-styrene copolymer (SIS). The thermoplastic block copolymer (B) including SBS or SIS makes the hot-melt PSA of the present invention retain adhesive force from a low temperature range to a high temperature range, and have stability with time under a high temperature environment, namely achieving excellent thermal stability.

In the present invention, it is possible to use, as the thermoplastic block copolymer (B), commercially available products. Examples thereof include "Asaprene T438" (trade name), "Asaprene T439" (trade name), "Asaprene T420" (trade name), "Tuftec H114" (trade name) and "Tuftec P1500" (trade name) manufactured by Asahi Kasei Chemicals Corporation; "TR2000" (trade name) manufactured by JSR CORPORATION; Taipol 4202 (trade name) manufactured by TSRC CORPORATION; "Kraton D1162 PT" (trade name) and "G1650M" (trade name) manufactured by Kraton Polymers LLC; "Quintac 3460" (trade name), "Quintac 3433N" (trade name), "Quintac 3520" (trade name) and "Quintac 3270" (trade name) manufactured by JAPAN ZEON CORPORATION; "D1160" (trade name) manufactured by Kraton Polymers LLC; "VECTOR 4114" (trade name) manufactured by DEXCO CORPORATION, and the like. These commercially available products can be used alone or in combination of two or more.

In the hot-melt PSA of the present invention, the blending amount of the amorphous polystyrene resin (A) in 100 parts by weight of the total amount of the amorphous polystyrene resin (A) and the thermoplastic block copolymer (B) is preferably 15 to 80 parts by weight, more preferably 25 to 60 parts by weight. The blending amount of the amorphous polystyrene resin (A) within the above range makes the hot-melt PSA of the present invention retain favorable adhesive force from a low temperature range to a high temperature range.

The hot-melt PSA of the present invention preferably further includes a tackifier (C). Blending the tackifier (C) improves the adhesive force of the hot-melt PSA.

The tackifier (C) means a thermoplastic resin (for example, a rosin-based resin, a terpene-based resin, a petroleum-based resin and the like) blended for the purpose of improving cohesive force of the tackifier and increasing the pressure-sensitive adhessiveness. The tackifier has a relatively low molecular weight, generally a number-average molecular weight of about 200 to about 3000.

In the present invention, the tackifier (C) is defined as those which have a weight-average molecular weight of 15,000 or less. Therefore, the amorphous polystyrene resin (A) having a weight-average molecular weight of 50,000 or more does not overlap with the tackifier (C).

Examples of the tackifier (C) include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a three dimensional polymer of a natural terpene, hydrogenated derivatives of a copolymer of a hydrogenated terpene, a polyterpene resin, hydrogenated derivatives of a phenol-based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, and hydrogenated derivatives of a cyclic aliphatic petroleum hydrocarbon resin. These tackifiers can be used alone or in combination of two or more.

It is also possible to use, as the tackifier, a liquid type tackifier (C) as long as it has a colorless to pale yellow color tone, has substantially no odor, and has stability with time under a high temperature environment, namely satisfactory thermal stability. From the viewpoint that the dispersibility of the amorphous polystyrene resin (A) is improved, hydrogenated derivatives of the above resins and the like are preferable as the tackifier (C).

It is possible to use, as the tackifier (C), commercially available products. Examples of the commercially available products include "ECR 5600" (trade name) manufactured by Exxon Mobil Corporation; "Maruka Clear H" (trade name) manufactured by MRUZEN PETROCHEMICAL CO, LTD.; "Clearon K100" (trade name) manufactured by YASUHARA CHEMICAL CO., LTD.; "Arcon M100" (trade name) manufactured by Arakawa Chemical Industries, Ltd.; "I-MARV S90" (trade name), "I-MARV S100" (trade name), "I-MARV S100N" (trade name), "I-MARV S110" (trade name) and "I-MARV Y135" (trade name) manufactured by Idemitsu Petrochemical Co., Ltd.; "Clearon K4090" (trade name) and "Clearon K4100" (trade name) manufactured by YASUHARA CHEMICAL CO., LTD.; "ECR 231C" (trade name) and "ECR 179EX" (trade name) manufactured by Exxon Mobil Corporation; "Regalite R7100" (trade name) manufactured by Eastman Chemical Company and the like. These commercially available tackifiers can be used alone or in combination of two or more.

Taking odor reduction of the hot-melt PSA into consideration, a blending amount of the tackifier (C) is preferably 50 to 200 parts by weight, more preferably 70 to 180 parts by weight, based on a total of 100 parts by weight of the amorphous polystyrene resin (A) and the thermoplastic block copolymer (B).

The hot-melt PSA of the present invention includes not only (A) to (C), but also a plasticizer (D), a stabilizer (E) or both of them, if necessary.

In the present invention, the "plasticizer (D)" is blended for the purpose of decreasing melt viscosity of the hot-melt PSA, imparting flexibility to the hot-melt PSA, and improving wettability of the hot-melt PSA to an adherend. There is no particular limitation on the plasticizer (D) as long as it is compatible with the thermoplastic block copolymer (B).

Examples of the plasticizer (D) include paraffin-based oil, naphthene-based oil, aromatic-based oil, and dibasic acid esters such as phthalate esters, trimellitate esters, adipate esters. The naphthene-based oil is particularly preferable because the dispersibility of the amorphous polystyrene is improved.

It is possible to use, as the plasticizer (D), commercially available products. Examples thereof include "White Oil Broom 350" (trade name) manufactured by Kukdong Oil & Chemicals Co., Ltd.; "Diana Fresia S32" (trade name), "Diana Fresia N90" (trade name), "Diana Process Oil PW-90" (trade name) and "DN Oil KP-68" (trade name) manufactured by IDEMITSU KOSAN CO., LTD.; "Enerper M1930" (trade name) manufactured by BP Chemicals, Inc.; "Kaydol" (trade name) manufactured by Crompton Corporation; "Primol 352" (trade name) manufactured by ESSO Corp.; "Sansocizer DINA" (adipic acid diisonyl ester) manufactured by New Japan Chemical Co., Ltd., and the like. These plasticizers (D) can be used alone or in combination of two or more.

The "stabilizer (E)" in the present invention is blended so as to prevent a decrease in molecular weight, occurrence of gelation, coloration, odor and the like of the hot-melt PSA due to heat, thereby improving stability of the hot-melt PSA. Examples of the stabilizer (E) include an antioxidant and an ultraviolet absorber.

The "ultraviolet absorber" is used so as to improve light resistance of the hot-melt PSA. The "antioxidant" is used so as to prevent oxidative degradation of the hot-melt PSA.

Examples of the antioxidant include a phenol-based antioxidant, a sulfur-based antioxidant and a phosphorous-based antioxidant. Examples of the ultraviolet absorber include a benzotriazole-based ultraviolet absorber and a benzophenone-based ultraviolet absorber. It is also possible to add a lactone-based stabilizer. These additives can be used alone or in combination.

It is possible to use, as the stabilizer, commercially available products. Examples thereof include "SUMILIZER GM" (trade name), "SUMILIZER TPD" (trade name) and "SUMILIZER TPS" (trade name) manufactured by Sumitomo Chemical Co. Ltd.; "IRGANOX 1010" (trade name), "IRGANOX HP2225FF" (trade name), "IRGAFOS 168" (trade name) and "IRGANOX 1520" (trade name) manufactured by Ciba Specialty Chemicals Inc.; JF77 (trade name) manufactured by Johoku Chemical Co., Ltd.; "ADEKA STAB AO-412S" (trade name) manufactured by ADEKA CORPORATION, and the like. These stabilizers can be used alone or in combination of two or more.

If necessary, the hot-melt PSA of the present invention may contain additives such as a fine particle filler other than the above additives. Examples of the "fine particle filler" include mica, calcium carbonate, kaolin, talc, titanium oxide, diatomite, urea-based resin, styrene beads, calcined clay, starch, and the like. Their shape is preferably spherical, and there is no particular limitation on their dimension (in case of the spherical filler, their diameter).

The hot-melt PSA of the present invention is obtained using the generally-known production method of a hot-melt PSA. Namely, the hot-melt PSA can be obtained by blending an amorphous polystyrene resin (A) and a thermoplastic block copolymer (B), and, if necessary, blending a tackifier (C), a plasticizer (D), a stabilizer (E), and other additives, followed by melting with heating. As long as the intended hot-melt PSA can be obtained, the order of adding the respective components, the heating method and the like are not particularly limited.

The obtained hot-melt PSA preferably has a melt viscosity at 140° C. of not more than 60,000 mPa·s, particularly preferably not more than 55,000 mPa·s, and most preferably not more than 50,000 mPa·s.

The melt viscosity at 160° C. of the hot-melt PSA is preferably not more than 5,000 mPa·s, more preferably not more than 3,500 mPa·s, and most preferably not more than 3,000 mPa·s. In the present specification, the "melt viscosity" means a viscosity in molten state of the hot-melt PSA and is measured by a Brookfield RVT-type viscometer (spindle No. 27).

The hot-melt PSA according to the present invention has a melt viscosity at 140° C. of as low as 60,000 mPa·s, and a viscosity at 160° C. of as low as 5,000 mPa·s, and therefore, is capable of being coated at a low temperature (not higher than 140° C.)

The hot-melt PSA can be fed in liquid form or semi-liquid form. The hot-melt PSA is preferred from the environmental point of view because it can be stored in a heat insulation container in liquid form or semi-liquid form, and fed as it is.

A method for coating the hot-melt PSA on a base material is not particularly limited as long as the intended PSA product can be obtained. Such a coating method is roughly classified, for example, into a contact coating method and a non-contact coating method. The "contact coating" method refers to a coating method in which a discharger is brought into contact with a member or a film in the case of coating the hot-melt PSA. The "non-contact coating" method refers to a coating method in which the discharger is not brought into contact with a member or a film in the case of coating the hot-melt PSA. Specific examples of the contact coating method include a slot coater coating method and a roll coater coating method. Specific examples of the non-contact coating method include a spiral coating method capable of being coated in a spiral form, an omega coating or control seam coating method capable of being coated in a wavy form, a slot spray coating or curtain spray coating method capable of being coated in a plane form, a bead coating method capable of being coated in a dot form, and the like.

The PSA products of the present invention are those products which are obtained by coating the hot-melt PSA on the base material or adherend. The hot-melt PSA of the present invention is applied to the base materials or adherends such as plastic film, cellophane, paper or non-woven fabric, and they are processed to become PSA products.

Specific examples of the PSA products include PSA tapes used for carrier tapes, packaging and the like; PSA labels used for display of commercial goods, luggage tags, POPs, stickers, stripes, name plates and the like; PSA sheets used for masking of printed-wiring boards, wrapping and packaging; and medical and hygiene materials such as adhesive plasters, first-aid adhesive tapes, surgical dressings, suture tapes, salicylic acid plasters, cataplasms, anti-inflammatory analgesic plasters, percutaneous absorption drugs, fixing tapes, self-adhesive bandages, heating pads, diapers, and sanitary goods.

EXAMPLES

The present invention will be described for the purpose of describing the present invention in more detail and specific manner by way of Examples and Comparative Examples. These are exemplary of the present invention and are not to be considered as limiting.

In Examples, unless otherwise specified, parts by weight and percentages by weight are based on the places where a solvent is not taken into account.

Components used in the present Examples are shown below.

(A) Amorphous polyethylene resin having a weight-average molecular weight of 50,000 or more (A1) Polystyrene resin ("GPPS-525N" (trade name) manufactured by VIETNAM POLYSTYRENE CO., LTD., weight-average molecular weight: 234,000, melting point: not detected)

(A2) Polystyrene resin ("TOYO STYROL GP G100C" (trade name) manufactured by TOYO POLYSTYRENE CO., LTD., weight-average molecular weight: 173,000, melting point: not detected)

(A3) Recycled polystyrene resin (recycled polystyrene resin manufactured by Trust Corporation, weight-average molecular weight: 360,000, melting point: not detected)

(A') Polystyrene-based resin that is not (A)

(A'4) Polystyrene-based resin ("Kristalex 3085" (trade name) manufactured by Eastman Chemical Company, weight-average molecular weight: 1,200, melting point: not detected (A'5) Polystyrene-based resin ("Kristalex 5140" (trade name) manufactured by Eastman Chemical Company, weight-average molecular weight: 4,900, melting point: not detected (A6') Polystyrene-based resin ("Piccolastic D125" (trade name) manufactured by Eastman Chemical Company, weight-average molecular weight: 45,300, melting point: not detected (A'7) Crystalline polystyrene-based resin ("XAREC S105" (trade name) manufactured by IDEMITSU KOSAN CO. LTD., weight-average molecular weight: 180,000, melting point: 270° C.)

(A'8) Crystalline polystyrene-based resin ("XAREC SP130" (trade name) manufactured by IDEMITSU KOSAN CO. LTD., weight-average molecular weight: 270,000, melting point: 270° C.)

(B) Thermoplastic block copolymer (B1) Non-hydrogenated styrene-isoprene-styrene block copolymer ("Quintac 3433N" manufactured by JAPAN ZEON CORPORATION", styrene content: 16 wt %)

(B2) Non-hydrogenated styrene-butadiene-styrene block copolymer ("Asaprene T438" (trade name) manufactured by Asahi Kasei Chemicals Corporation", styrene content: 35 wt %)

(C) Tackifier (C1) Partially hydrogenated petroleum resin ("I-MARV S100" (trade name) manufactured by Idemitsu Petrochemical Co., Ltd., softening point: 100° C., weight-average molecular weight: 1,200)

(D) Plasticizer (D1) Naphthene-based oil ("Diana Fresia N90" (trade name) manufactured by IDEMITSU KOSAN CO., LTD.)

(D2) Paraffin-based oil ("Diana Fresia S32" (trade name) manufactured by IDEMITSU KOSAN CO., LTD.)

(E) Stabilizer (E1) Phenol-based antioxidant ("SUMILIZER GM" (trade name) manufactured by Sumitomo Chemical Co. Ltd.

(E2) Sulfur-based antioxidant ("ADEKA STAB AO-412S" (trade name) manufactured by ADEKA CORPORATION)

The weight-average molecular weights of the component (A) and the component (C) are values in terms of polystyrene measured by gel permeation chromatography (GPC). Specifically, the values were measured by using the following GPC apparatus and measurement method.

"HCL-8220 GPC" (trade name) manufactured by TOSOH CORPORATION was used as a GPC apparatus, and "RI" was used as a detector. Two GPC columns "TSKgel Super-Multipore HZ-M" (trade name) manufactured by TOSOH CORPORATION were used. A sample was dissolved in tetrahydrofuran, and the solution was allowed to flow at a flow rate of 0.35 mL/min, and a column temperature of 40° C. to obtain a molecular weight. By using a calibration curve using polystyrene resin having a monodispersed molecular weight as a standard substance, the molecular weight was converted to obtain a weight-average molecular weight.

The melting points of the component (A) are values measured by using differential scanning calorimetry (DSC). Specifically, using "DSC 6220" (trade name) manufactured by SII Nanotechnology Corporation, 10 mg of a sample was weighed in an aluminum vessel. The peak temperature of melting peaks observed when measured at a temperature rising speed of 5° C./min from 0° C. to 300° C. was defined as a melting point.

Preparation of Hot-melt PSA

Components (A) to (E) were blended at blending ratios shown in Table 1 and Table 2, and melt-mixed using a universal stirrer to prepare hot-melt PSAs of Examples 1-9. Hot-melt PSAs of Comparative Examples 1-9 shown in Table 3 and Table 4 were also prepared under the same conditions as those in the Examples.

With regard to the hot-melt PSAs of Examples 1-9, and Comparative Examples 1-9, change in adhesive force, odor, and thermal stability described below were evaluated.

On the other hand, with regard to Comparative Examples 10-15 shown in Table 5, since crystalline polystyrene resins (A'7) and (A'8) were not dispersed at all, it was not possible to prepare a hot-melt PSA. Therefore, it was not possible to make various evaluations of the hot-melt PSA.

Respective evaluation methods will hereinafter be described.

Adhesive Force Retention

A hot-melt PSA was coated about 2 mm thick on a 50μ thick PET film using a heat roller. The resultant film was cut into strip-shaped test pieces which were each 2.5 cm wide and 7 cm length.

After the test piece was kept at predetermined temperatures (0° C., 23° C., and 40° C.) for 2 hours, a tack surface of the test piece was put on a stainless steel plate using a 2 kg roller. Adhesive forces (g/25 mm) of the test pieces were measured using a universal tensile testing machine at 0° C., 23° C., and 40° C., a peeling speed of 300 mm/min, and a peeling angle of 180°.

From the adhesive forces measured at the respective temperatures, adhesive force retention rates were calculated. The calculation formula is shown below.

Adhesive force retention rate (%)=(Adhesive force at a given temperature)×100/(Adhesive force at 23° C.)

Evaluation criteria are as follows:

| (Adhesive force retention rate) ≥ 90% | ⊚ |
|---|---|
| 90% > (Adhesive force retention rate) ≥ 70% | ○ |
| 70% > (Adhesive force retention rate) ≥ 50% | Δ |
| 50% > (Adhesive force retention rate) | X |

Odor 10 g of a hot-melt PSA was put in a 30 mL glass bottle, and left to stand under atmosphere at 150° C. for one day. After cooling, the glass bottle was sealed, and left to stand at room temperature for one hour. Thereafter, odor of the hot-melt PSA was evaluated.

Evaluation criteria are as follows:

| Hardly smell an odor | ⊚ |
|---|---|
| There is an odor, but hardly smell an unpleasant odor | ○ |
| Slightly smell an unpleasant odor | Δ |
| Distinctly smell an unpleasant odor | X |

Stability with Time

A hot-melt PSA was left to stand in a 160° C. oven for one day. Then, its melt viscosity at 160° C. was measured. A melt-viscosity change rate from an initial melt viscosity to a melt viscosity one day after the initial melt viscosity was found. The calculation formula is shown below.

(Viscosity change rate (%))=((Initial melt viscosity)−(Melt viscosity of one day after))×100/(Initial melt viscosity)

Absolute values of the calculated viscosity change rates were evaluated according to the following judgment criteria.

| (Absolute value of viscosity change rate) < 10 | ⊚ |
|---|---|
| 10 ≤ (Absolute value of viscosity change rate) < 15 | ○ |
| 15 ≤ (Absolute value of viscosity change rate) < 20 | Δ |
| 20 ≤ (Absolute value of viscosity change rate) | X |

The melt viscosity is a value measured at 160° by a No. 27 rotor, using a Brookfield viscometer, and a thermocell.

TABLE 1

|  | Example 1 | Example 2 | Example 3 | Example 4 | Example 5 |
|---|---|---|---|---|---|
| (A) Amorphous polystyrene resin |  |  |  |  |  |
| (A1) | 17 | 56 |  |  | 70 |
| (A2) |  |  | 56 |  |  |
| (A3) |  |  |  | 56 |  |
| (B) Thermoplastic block copolymer |  |  |  |  |  |
| (B1) | 83 | 44 | 44 | 44 | 30 |
| (B2) |  |  |  |  |  |
| (C) Tackifier |  |  |  |  |  |
| (C1) | 166 | 77 | 77 | 77 | 60 |
| (D) Plasticizer |  |  |  |  |  |
| (D1) | 66 | 44 | 44 | 44 | 40 |
| (D2) |  |  |  |  |  |
| (E) Stabilizer |  |  |  |  |  |
| (E1) | 0.7 | 0.4 | 0.4 | 0.4 | 0.4 |
| (E2) | 1.0 | 0.7 | 0.7 | 0.7 | 0.6 |

TABLE 1-continued

|  | Example 1 | Example 2 | Example 3 | Example 4 | Example 5 |
|---|---|---|---|---|---|
| Adhesive force retention at 0° C. |  |  |  |  |  |
| Adhesive force retention rate at 0° C. | 191 | 181 | 234 | 205 | 102 |
| Judgment | ◎ | ◎ | ◎ | ◎ | ◎ |
| Adhesive force retention at 40° C. |  |  |  |  |  |
| Adhesive force retention rate at 40° C. | 78 | 89 | 100 | 95 | 74 |
| Judgment | ○ | ○ | ◎ | ◎ | ○ |
| Odor |  |  |  |  |  |
| Judgment | ○ | ○ | ○ | ○ | ◎ |
| Stability with time |  |  |  |  |  |
| Viscosity change rate | −13 | −9 | −11 | −10 | +2 |
| Judgment | ○ | ◎ | ○ | ○ | ◎ |

TABLE 2

|  | Example 6 | Example 7 | Example 8 | Example 9 |
|---|---|---|---|---|
| (A) Amorphous polystyrene resin |  |  |  |  |
| (A1) | 70 | 50 |  | 75 |
| (A2) |  |  |  |  |
| (A3) |  |  | 60 |  |
| (B) Thermoplastic block copolymer |  |  |  |  |
| (B1) | 30 |  |  |  |
| (B2) |  | 50 | 40 | 25 |
| (C) Tackifier |  |  |  |  |
| (C1) | 60 | 100 | 75 | 100 |
| (D) Plasticizer |  |  |  |  |
| (D1) |  |  |  |  |
| (D2) | 40 | 25 | 30 | 50 |
| (E) Stabilizer |  |  |  |  |
| (E1) | 0.4 | 0.4 | 0.5 | 0.5 |
| (E2) | 0.6 | 0.6 | 0.8 | 0.8 |
| Adhesive force retention at 0° C. |  |  |  |  |
| Adhesive force retention rate at 0° C. | 136 | 75 | 137 | 166 |
| Judgment | ◎ | ○ | ◎ | ◎ |
| Adhesive force retention at 40° C. |  |  |  |  |
| Adhesive force retention rate at 40° C. | 70 | 70 | 73 | 88 |
| Judgment | ○ | ○ | ○ | ○ |
| Odor |  |  |  |  |
| Judgment | ◎ | ○ | ○ | ◎ |
| Stability with time |  |  |  |  |
| Viscosity change rate | −14 | −12 | −10 | −7 |
| Judgment | ○ | ○ | ○ | ◎ |

TABLE 3

|  | Comp. Example 1 | Comp. Example 2 | Comp. Example 3 | Comp. Example 4 | Comp. Example 5 |
|---|---|---|---|---|---|
| (A') Amorphous polystyrene resin having a weight-average molecular weight of less than 50,000 |  |  |  |  |  |
| (A' 4) | 17 |  |  | 56 |  |
| (A' 5) |  | 17 |  |  | 56 |
| (A' 6) |  |  | 17 |  |  |
| (B) Thermoplastic block copolymer |  |  |  |  |  |
| (B1) | 83 | 83 | 83 | 44 | 44 |
| (C) Tackifier |  |  |  |  |  |
| (C1) | 166 | 166 | 166 | 77 | 77 |
| (D) Plasticizer |  |  |  |  |  |
| (D1) | 66 | 66 | 66 | 44 | 44 |
| (E) Stabilizer |  |  |  |  |  |
| (E1) | 0.7 | 0.7 | 0.7 | 0.4 | 0.4 |
| (E2) | 1.0 | 1.0 | 1.0 | 0.7 | 0.7 |
| Adhesive force retention at 0° C. |  |  |  |  |  |
| Adhesive force retention rate at 0° C. | 7 | 7 | 40 | 2 | 5 |
| Judgment | X | X | X | X | X |
| Adhesive force retention at 40° C. |  |  |  |  |  |
| Adhesive force retention rate at 40° C. | 61 | 73 | 82 | 44 | 40 |
| Judgment | Δ | ○ | ○ | X | X |
| Odor |  |  |  |  |  |
| Judgment | Δ | Δ | Δ | X | Δ |
| Stability with time |  |  |  |  |  |
| Viscosity change rate | −28 | −18 | −20 | −14 | −14 |
| Judgment | X | Δ | X | ○ | ○ |

TABLE 4

|  | Comp. Example 6 | Comp. Example 7 | Comp. Example 8 | Comp. Example 9 |
|---|---|---|---|---|
| (A') Amorphous polystyrene resin having a weight-average molecular weight of less than 50,000 |  |  |  |  |
| (A' 4) |  | 70 |  |  |
| (A' 5) |  |  | 70 |  |
| (A' 6) | 56 |  |  | 70 |
| (B) Thermoplastic block copolymer |  |  |  |  |
| (B1) | 44 | 30 | 30 | 30 |
| (C) Tackifier |  |  |  |  |
| (C1) | 77 | 60 | 60 | 60 |
| (D) Plasticizer |  |  |  |  |
| (D1) | 44 | 40 | 40 | 40 |

TABLE 4-continued

|  | Comp. Example 6 | Comp. Example 7 | Comp. Example 8 | Comp. Example 9 |
|---|---|---|---|---|
| (E) Stabilizer | | | | |
| (E1) | 0.4 | 0.4 | 0.4 | 0.4 |
| (E2) | 0.7 | 0.6 | 0.6 | 0.6 |
| Adhesive force retention at 0° C. | | | | |
| Adhesive force retention rate at 0° C. | 38 | 0 | 0 | 40 |
| Judgment | X | X | X | X |
| Adhesive force retention at 40° C. | | | | |
| Adhesive force retention rate at 40° C. | 69 | 46 | 60 | 65 |
| Judgment | Δ | X | Δ | Δ |
| Odor | | | | |
| Judgment | Δ | X | X | X |
| Stability with time | | | | |
| Viscosity change rate | −29 | −29 | −23 | −23 |
| Judgment | X | X | X | X |

TABLE 5

|  | Comp. Example 10 | Comp. Example 11 | Comp. Example 12 | Comp. Example 13 | Comp. Example 14 | Comp. Example 15 |
|---|---|---|---|---|---|---|
| (A') Crystalline polystyrene-based resin | | | | | | |
| (A'7) | 17 | | 56 | | 70 | |
| (A'8) | | 17 | | 56 | | 70 |
| (B) Thermoplastic block copolymer | | | | | | |
| (B1) | 83 | 83 | 44 | 44 | 30 | 30 |
| (B2) | | | | | | |
| (C) Tackifier | | | | | | |
| (C1) | 166 | 166 | 77 | 77 | 60 | 60 |
| (D) Plasticizer | | | | | | |
| (D1) | 66 | 66 | 44 | 44 | 40 | 40 |
| (E) Stabilizer | | | | | | |
| (E1) | 0.7 | 0.7 | 0.4 | 0.4 | 0.4 | 0.4 |
| (E2) | 1.0 | 1.0 | 0.7 | 0.7 | 0.6 | 0.6 |
| Adhesive force retention at 0° C. | | | | | | |
| Adhesive force retention rate at 0° C. | — | — | — | — | — | — |
| Judgment | — | — | — | — | — | — |
| Adhesive force retention at 40° C. | | | | | | |
| Adhesive force retention rate at 40° C. | — | — | — | — | — | — |
| Judgment | — | — | — | — | — | — |
| Odor | | | | | | |
| Judgment Stability with time | — | — | — | — | — | — |
| Viscosity change rate Judgment | — | — | — | — | — | — |

As shown in Table 1 and Table 2, the hot-melt PSAs of Examples 1-9 have high adhesive force retention rates at 0° C. and 40° C. (namely, excellent in adhesive force retention rate from a low temperature range to a high temperature range), low odor, and are excellent also under a high temperature environment (have a small viscosity change rate).

Further, since the hot-melt PSAs of Examples 4 and 8 include a recycled amorphous polystyrene resin (A3), they have the above properties, and are also environmentally friendly.

As shown in Table 3 and Table 4, the hot-melt PSAs of Comparative Examples 1-9 cannot exhibit the above properties at the same time as compared with the hot-melt PSAs of the Examples.

As shown in FIG. 5, when crystalline polystyrene-based resins (A'7) and (A'8) were blended, since the melting points of (A'7) and (A'8) are too high, it was not possible to produce a hot-melt PSA itself.

The present invention can provide a hot-melt PSA, and a PSA product on which the hot-melt PSA is coated. The hot-melt PSA of the present invention is suitable to be coated on a plastic (polyethylene terephthalate or polypropylene) film or a paper base material. Therefore, PSA products produced from the above film (e.g., hygiene materials), and PSA products produced from the paper base material (e.g., PSA labels, PSA tapes) are particularly useful as the present invention.

The invention claimed is:

1. A hot-melt pressure-sensitive adhesive comprising:
    a mixture of polymers consisting of (i) an amorphous polystyrene resin (A) having a weight-average molecular weight of 50,000 or more and (ii) a thermoplastic block copolymer (B) selected from styrene-butadiene-styrene copolymer and/or styrene-isoprene-styrene copolymer; and
    a tackifier (C) which may be polymeric;
    wherein the hot-melt pressure-sensitive adhesive is characterized as exhibiting an adhesive force retention rate of about 70-100 at T1 and 75-234 at T2;
    wherein the adhesive force retention rate is calculated as

[(measured adhesive force at T1 or T2)×100%]/ [measured adhesive force at T3], wherein the measured adhesive force was determined with a universal tensile testing machine with a peeling speed of 300 mm/min and a peeling angle of 180° from a sample size of 25×70 mm and 2 mm thickness, equilibrated at T1, T2 or T3 for 2 hours; and then applied onto a stainless steel plate with a 2 kq roller, and
    wherein T1 is 40° C., T2 is 0° C., and T3 is 23° C.

2. A pressure-sensitive adhesive product obtained by coating the hot-melt pressure-sensitive adhesive according to claim 1.

3. A hot-melt pressure-sensitive adhesive consisting essentially of
  an amorphous polystyrene resin (A) having a weight-average molecular weight of 230,000 to 360,000;
  a thermoplastic block copolymer (B) selected from styrene-butadiene-styrene copolymer and/or styrene-isoprene-styrene copolymer;
  a tackifier (C);
  a plasticizer (D); and
  a stabilizer (E).

4. A hot-melt pressure-sensitive adhesive comprising:
  a recycled amorphous polystyrene resin (A) having a weight-average molecular weight of 230,000 to 360,000;
  a thermoplastic block copolymer (B) selected from styrene-butadiene-styrene copolymer and/or styrene-isoprene-styrene copolymer; and
  a tackifier (C);
  wherein the hot-melt pressure-sensitive adhesive is characterized as exhibiting an adhesive force retention rate of about 70-100 at T1 and 75-234 at T2;
  wherein the adhesive force retention rate is calculated as:

[(measured adhesive force at T1 or T2)×100%]/ [measured adhesive force at T3], wherein the measured adhesive force was determined with a universal tensile testing machine with a peeling speed of 300 mm/min and a peeling angle of 180° from a sample size of 25×70 mm and 2 mm thickness, equilibrated at T1, T2 or T3 for 2 hours; and then applied onto a stainless steel plate with a 2 kq roller, and
  wherein T1 is 40° C., T2 is 0° C., and T3 is 23° C.

* * * * *

UNITED STATES PATENT AND TRADEMARK OFFICE
CERTIFICATE OF CORRECTION

PATENT NO. : 10,604,682 B2
APPLICATION NO. : 15/274082
DATED : March 31, 2020
INVENTOR(S) : Yukio Isobe, Itsuro Tomatsu and Tadashi Hayakawa It is certified that error appears in the above-identified patent and that said Letters Patent is hereby corrected as shown below:

In the Claims

Column 14, Line 62: Change "kq" to --kg--.

Column 16, Line 14: Change "kq" to --kg--.

Signed and Sealed this
Eleventh Day of August, 2020

Andrei Iancu
*Director of the United States Patent and Trademark Office*